US006993443B2

United States Patent
Härle

(10) Patent No.: US 6,993,443 B2
(45) Date of Patent: Jan. 31, 2006

(54) METHOD FOR DETERMINING AND TRACKING THE POSITION AND ORIENTATION OF A MAGNETIC FIELD SENSOR

(75) Inventor: Norbert Härle, Bremen (DE)

(73) Assignee: Rheinmetall Defence Electronics GmbH, (DE)

( * ) Notice: Subject to any disclaimer, the term of this patent is extended or adjusted under 35 U.S.C. 154(b) by 17 days.

(21) Appl. No.: 10/782,769

(22) Filed: Feb. 23, 2004

(65) Prior Publication Data

US 2004/0186681 A1   Sep. 23, 2004

(30) Foreign Application Priority Data

Feb. 22, 2003  (DE)  ................................. 103 07 580

(51) Int. Cl.
  *G01C 17/38*    (2006.01)

(52) U.S. Cl. .......................... 702/95; 702/94; 600/424; 324/207.11

(58) Field of Classification Search ................. 702/94, 702/95, 150, 152, 153; 600/423, 424; 324/207.11, 324/207.12

See application file for complete search history.

(56) References Cited

U.S. PATENT DOCUMENTS 6,484,118 B1 * 11/2002 Govari ........................ 702/150
6,636,757 B1 * 10/2003 Jascob et al. ................ 600/424

OTHER PUBLICATIONS

Raab et al., "Magnetic Position and Orientation Tracking System", IEEE Transaction on Aerospace and Electronic Systems, Vol., AES-15, No. 5, pp. 709-718, Sep. 1979.

\* cited by examiner

*Primary Examiner*—Michael Nghiem
*Assistant Examiner*—Stephen J. Cherry
(74) *Attorney, Agent, or Firm*—Venable; Michael A. Sartori; Jeffri A. Kaminski

(57) ABSTRACT

With a method for determining and tracking a changing, true position and orientation of a magnetic field sensor within a three-dimensional magnetic field space from the values measured by the magnetic field sensor, the magnetic field space is structured in a preceding calibration mode into a three-dimensional grid with equidistant grid points. All values measured by the magnetic field sensor are then stored in a calibration table as calibration positions and calibration orientations allocated to the real positions of the grid points in the magnetic field space. A linear interpolating transformation of the measuring position in the real magnetic field space is executed for the measuring values from the magnetic field sensor by using respectively four calibration positions taken from the calibration table, which span a tetrahedron that encloses the measuring position.

21 Claims, 3 Drawing Sheets

| grid point No. | $\vec{p}$ | | | $\vec{p}^M$ | | | $\vec{p}^{M,O}$ | | |
|---|---|---|---|---|---|---|---|---|---|
| | x | y | z | $x^M$ | $y^M$ | $z^M$ | $h^M$ | $p^M$ | $r^M$ |
| 1 | . | . | . | . | . | . | . | . | . |
| 2 | . | . | . | . | . | . | . | . | . |
| 3 | . | . | . | . | . | . | . | . | . |
| 4 | . | . | . | . | . | . | . | . | . |
| 5 | . | . | . | . | . | . | . | . | . |
| 6 | . | . | . | . | . | . | . | . | . |
| 7 | . | . | . | . | . | . | . | . | . |
| 8 | . | . | . | . | . | . | . | . | . |

METHOD FOR DETERMINING AND TRACKING THE POSITION AND ORIENTATION OF A MAGNETIC FIELD SENSOR

FIELD OF THE INVENTION

The invention relates to a method for determining and tracking the changing, true position and orientation of a magnetic field sensor within a three-dimensional magnetic field space with the aid of the values supplied by the magnetic field sensor as measuring position and measuring orientation.

BACKGROUND OF THE INVENTION

For a realistic simulation of images that change when the head position and head orientation of the observer changes, e.g. of panoramic image details shown on the night-vision goggles of a pilot, the observer's point of sight and thus his/her exact head position and orientation must be known for a precise calculation of the image detail that changes with the head movement. A magnetic field is generated in a real space in which the observer is seated, e.g. in the cockpit of an airplane or a helicopter, and a magnetic field sensor is attached to the head of the observer for sensing the magnetic field. The values measured by the magnetic field sensor represent a measure for the momentary head position or the momentary orientation of the observer's head in the magnetic field space and are referred to in the following as measuring position and measuring orientation.

A magnetic field sensor of this type operates without problems in the undisturbed, homogeneous magnetic field. However, the magnetic field of most magnetic field spaces is distorted by the presence of metal objects, for example the metal struts of a flight simulator cockpit. The measuring values output by the magnetic field sensor thus deviate from the true position and orientation of the magnetic field sensor in the real magnetic field space. In the distorted magnetic field space, the measuring values output by the magnetic field sensor must therefore be corrected to obtain the actual or so-called true position and true orientation of the magnetic field sensor, which is indispensable for a precise and realistic simulation of the image details.

A number of different methods are known for correcting the false measuring values output by the magnetic field sensor that is located in the distorted magnetic field. However, these methods do not yield sufficient and satisfying results, at least not for sight simulation. With one known method, the correlation between the true position and true orientation of the magnetic field sensor and the values measured by this sensor is determined experimentally and stored in a calibration table. In a pre-processing step, the calibration space is scanned and an approximation is used to obtain the associated, real position values by using the calibration table and interpolating the position values in the real magnetic field space. During the measuring phase, a trilinear interpolation is performed between the actually measured positions and the real position values to obtain the true position of the magnetic field sensor. (Volodymyr Kindratenko "Calibration of electromagnetic tracking device," Virtual Reality, Research, Development, and Applications, Vol. 4, 1999, pages 139–150, with reference to Raab, Blood, Steioner, Jones: "Magnetic position and orientation tracking system"; IEEE Transactions on Aerospace and Electronic Systems 1979, 15(5), pages 709–718). This method is based on the assumption that the magnetic field interference in a space is linear, which is true only in exceptional cases.

Thus, there is a need for a robust method for determining the true values for position and orientation of a magnetic field sensor from the measuring values output by the magnetic field sensor. The method should provide results that are usable for sight simulation even in magnetic fields with heavy distortion or interference.

SUMMARY OF THE INVENTION

The advantage of the method according to embodiments of the invention is that the area directly surrounding the magnetic field sensor in the real magnetic field space is used for correcting the measuring values. Thus, the method still delivers good results, even with considerable differences locally in the interference of the magnetic field, that is even under conditions where the prior art methods fail. Thus, it is possible with the method according to embodiments of the invention to provide a fairly accurate true position and constant tracking of this position. This allows the method to avoid the problems of ambiguity that have occurred in previous attempts.

According to one advantageous embodiment of the invention, a transformation matrix A is determined with the aid of four calibration positions taken from a calibration table. The calibration positions span a tetrahedron that encloses the measuring field position in the three-dimensional calibration space coordinate system, such that the four calibration positions are transformed correctly to the three-dimensional coordinate system of the real magnetic field space, which in the following is referred to a real space coordinate system. In order to determine the true position, the transformation matrix A is then applied to the measuring position.

If $\vec{p}^M$ is the position vector of the measuring position and $\vec{p}$ is the position vector of the transformed measuring position, which corresponds to the true position of the magnetic field sensor, then the following applies:

$$\vec{p} = A \cdot \vec{p}^M + \vec{p}^{\,off} \qquad (1),$$

wherein $\vec{p}^{\,off}$ is an offset that should be taken into consideration during the transformation.

According to one advantageous embodiment of the invention, a first calibration position of the four calibration positions is moved to a point of origin of the calibration space coordinate system prior to the transformation, so as to avoid the offset determination, and the other three calibration positions are displaced by the position coordinates of the first calibration position. Of the grid-point positions associated with the four calibration positions, the first grid-point position belonging to the first calibration position is moved to the point of origin of the real space coordinate system and the remaining three grid-point positions are displaced by the position coordinates of the first grid-point position. The transformation to the real magnetic field space, or to be more precise to the three-dimensional coordinate system of the real magnetic field space (real space coordinate system), is realized with the aid of the displaced calibration positions as follows:

$$\vec{p}_i^V = A \vec{p}_i^{M,V} \text{ with } i=1, 2, 3 \quad (2).$$

An equation system including nine transformation equations with nine unknown quantities is obtained, from which the transformation matrix A can be easily computed. With each new measuring value, the calibration positions that span the tetrahedron are determined anew and the transformation matrix is also computed anew.

If the transformation matrix is applied to the measuring position, the latter must also be first displaced accordingly in the calibration space coordinate system. This displacement is reversed again following the transformation to the real space coordinate system, thus resulting in a fairly accurate true position of the magnetic field sensor in the magnetic field space.

The true magnetic field sensor position is first determined on the basis of a measuring value from the magnetic field sensor, as described in the above. According to one advantageous embodiment of the invention, the true position of the magnetic sensor is then used to determine a corrected orientation for the magnetic field sensor. The corrected orientation is then used to determine the true orientation of the magnetic field sensor for the measuring orientation.

According to one advantageous embodiment of the invention, a trilinear interpolation is performed to determine the correction orientation with the calibration orientations, for which the associated grid-point positions in the real space coordinate system span a cube that encloses the true position of the magnetic field sensor.

BRIEF DESCRIPTION OF THE FIGURES

The invention is described in further detail in the following, with the aid of an exemplary embodiment illustrated in the drawing Shown are in.

DETAILED DESCRIPTION OF THE PREFERRED EMBODIMENT

Figure 1:
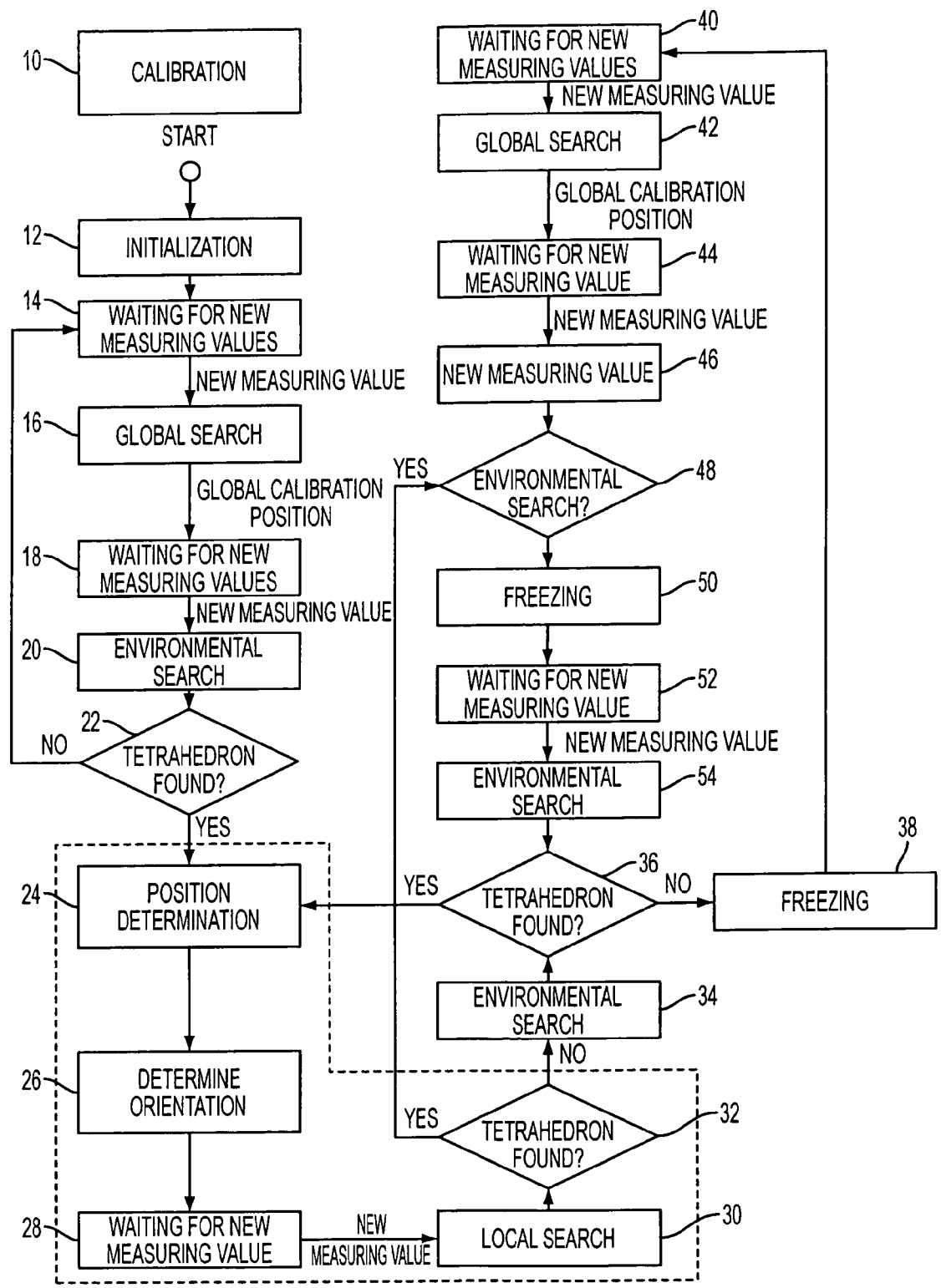
FIG. 1 A flow chart illustrating a method according to an embodiment of the invention.
Figures 2, 3:
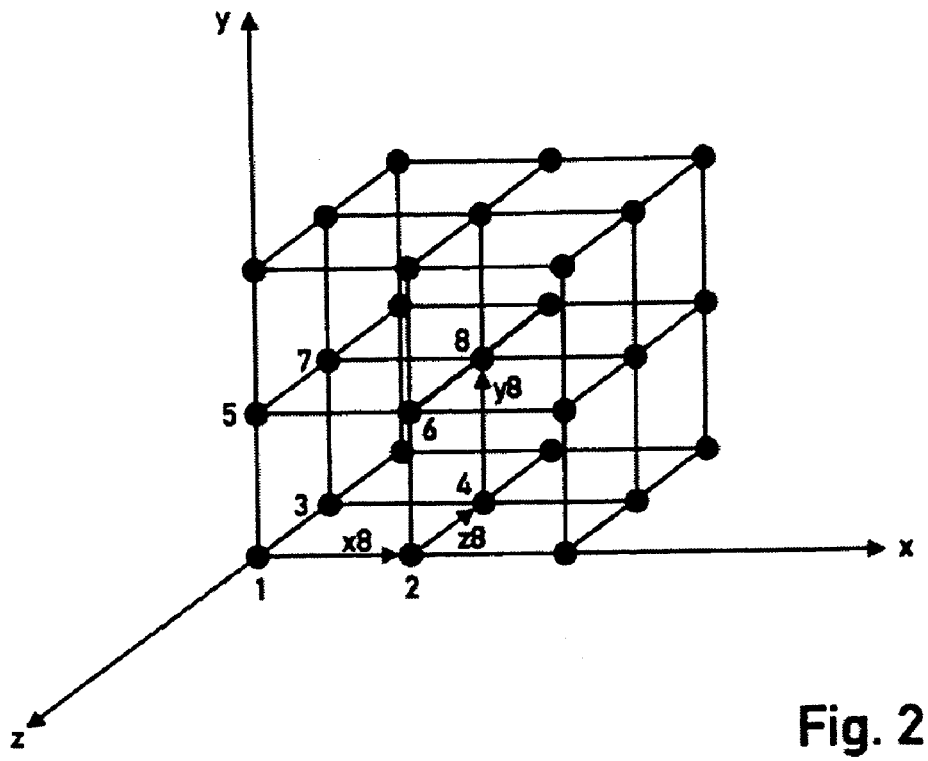
FIG. 2 Sectional views of the structuring of a magnetic field space with the three-dimensional coordinate system x, y, z in a three-dimensional grid with equidistant grid points.
FIG. 3 A sectional view of a calibration table, empirically collected in the magnetic field space.

The method illustrated in the flow chart shown in FIG. 1 is used to correctly determine a position and orientation of a magnetic field sensor that moves within a three-dimensional magnetic field space, even if the magnetic field generated in the magnetic field space is disturbed or distorted in some regions and the magnetic field sensor delivers incorrect measuring values for the true position and true orientation in those regions. In the following, the measuring values output by the magnetic field sensor are referred to as measuring position and measuring orientation. The method is preceded by a calibration mode in which the magnetic field space is structured into a three-dimensional grid with equidistant grid points. One grid point is preferably located at the point of origin of a three-dimensional coordinate system x, y, z that in the following is called the real space coordinate system. Each grid point thus has a position vector $\vec{p}$ with the coordinates x, y and z. FIG. 2 contains sectional views of a real space coordinate system of this type with a grid structure. In this case, the coordinates $x_8$, $y_8$ and $z_8$ are provided as example coordinates for the grid point 8. The magnetic field sensor is then positioned successively and with constant orientation or alignment at all of the grid points. The values measured by the magnetic field sensor at each grid point are allocated as a calibration position and a calibration orientation to the real position of the grid point and are stored in a calibration table. FIG. 3 shows sections of an example of a calibration table. Each grid point has a position vector $\vec{p}$ with the coordinates x, y, z in the real magnetic field space, to which a position vector $\vec{p}^M$ with the calibration position $x^M$, $y^M$ and $z^M$ is allocated, as well as a rotation vector of the calibration orientation $\vec{p}^{M,O}$ with the orientation values for heading $h^M$, pitch $p^M$ and roll $r^M$. The calibration positions are located in a three-dimensional coordinate system of the calibration space, which in the following is called the calibration space coordinate system. In contrast to the grid positions in the real magnetic field space, the calibration positions in the calibration space are not equidistant. The calibration is preferably made only once and is superimposed again only if the magnetic field space and/or the magnetic field generated therein is changed.

If necessary, the data stored in the calibration table are processed further, for example to correct incorrect algebraic signs during a hemisphere change or to fill in missing data that could not be measured at specific grid points by using interpolation or extrapolation. With the method described in further detail in the following for determining the true position and the true orientation of the magnetic field sensor from the measuring values provided by the sensor, the true position of the magnetic field sensor in the magnetic field space is initially determined and this position is subsequently used to determine the true orientation of the magnetic field sensor. The most important part of the position determination is the determination of four calibration points from the calibration table that span a tetrahedron in the calibration space coordinate system that encloses the measuring position actually measured by the magnetic field sensor. If such a tetrahedron is found, a linear interpolating transformation of the measuring position to the real magnetic field space is carried out with those four calibration positions. The transformed measuring position is output as the true magnetic sensor position. For this, a transformation matrix A is determined with the aid of the four calibration positions, such that the four calibration positions are correctly transformed to the real space coordinate system. With the aid of the transformation matrix obtained in this way, the measuring position is transformed as follows:

$$\vec{p} = A \cdot \vec{p}^M + \vec{p}^{off} \quad (1)$$

to the real space coordinate system. In this case, $\vec{p}^M$ is the actually measured position, $\vec{p}$ is the true position of the magnetic field sensor in the real space coordinate system and $\vec{p}^{off}$ is an offset that must be taken into account during the transformation. To avoid having to compute the offset when computing the transformation matrix A, as well as when applying the transformation matrix A to the measuring position for transforming the measuring position to the real magnetic field space, one of the first four calibration positions is initially displaced to the point of origin of the three-dimensional calibration space coordinate system and the other calibration positions are displaced by the position coordinates of the first calibration position. Also, of the grid points allocated to the four calibration positions, the first grid point position belonging to the first calibration position is moved to the point of origin of the three-dimensional real space coordinate system and the remaining grid-point positions are displaced by the position coordinates of the first grid-point position. With the aid of the calibration positions $\vec{p}_i^{M,V}$, displaced in this way, and the grid point positions $\vec{p}_i^V$, the calibration position is thus transformed to the real space coordinate system as follows:

$$\vec{p}_i^V = A \vec{p}_i^{M,V} \text{ with } i=1, 2, 3 \quad (2)$$

As a result, an equation system with nine equations and nine unknown values is obtained, which looks as follows when written as a matrix:

$$\begin{bmatrix} x_i^V \\ y_i^V \\ z_i^V \end{bmatrix} = \begin{bmatrix} A_{1,1} A_{1,2} A_{1,3} \\ A_{2,1} A_{2,2} A_{2,3} \\ A_{3,1} A_{3,2} A_{3,3} \end{bmatrix} \begin{bmatrix} x_i^{M,V} \\ y_i^{M,V} \\ z_i^{M,V} \end{bmatrix} \quad (3)$$

From this equation system, the elements $A_{1,1}, A_{1,2} \ldots$ of the transformation matrix A can be easily computed. This transformation matrix is not applied directly to the measuring position, but to a measuring position that has been displaced in the same way as the three calibration positions in the calibration coordinate system. In other words, the vector subtracted from the position vector of the measuring position is the vector of the calibration position which has been displaced to the point of origin of the three-dimensional calibration coordinate system. The transformation matrix is applied to the displaced measuring position $\vec{p}_i^{M,V}$ as follows:

$$\vec{p}^V = A \vec{p}_i^{M,V} \quad (4)$$

To obtain the true position $\vec{p}$ of the magnetic field sensor from this measuring position $\vec{p}^V$ that has been transformed to the real magnetic field space and is still displaced, the displacement must be reversed again by adding the position vector of the grid-point position that has been displaced to the point of origin of the real space coordinate system to the position vector of the transformed, displaced measuring position $\vec{p}^V$.

Once the true position of the magnetic field sensor is determined, as described in the above, the true orientation of the magnetic field sensor is determined. For this, a correction orientation is determined with the aid of the true magnetic field sensor position and is applied to the measuring orientation measured by the magnetic sensor for determining the true orientation. To determine the correction orientation, eight calibration positions for which the associated grid-point positions in the real space coordinate system span a cube that encloses the true position of the magnetic field sensor are selected from the calibration table. A trilinear interpolation is then performed with these eight calibration orientations, which results in the correction orientation. This correction orientation is either applied individually to the orientation values $h^M$, $p^M$ and $r^M$ or, preferably, to the rotation vector $\vec{p}^{M,O}$ formed with these values.

In order to determine whether or not a tetrahedron spanned by four calibration positions in the calibration space coordinate system of the calibration table encloses the measuring position, it is determined for all four surfaces of the tetrahedron on which side of the tetrahedron surface the measuring position is located. If the measuring position for all four tetrahedron surfaces is located on the same side of the tetrahedron surface as the associated fourth tetrahedron point that does not belong to the tetrahedron surface, then the tetrahedron is identified as one that encloses the measuring position.

Figure 8:
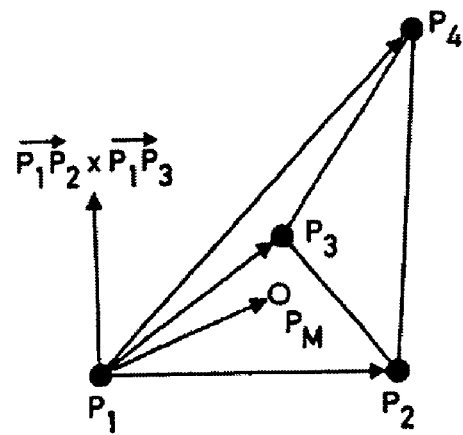
FIG. 8 A schematic diagram for the vector definition used to search for a tetrahedron that encloses the measuring position.

Using tetrahedron surfaces when searching for the enclosed measuring position avoids discontinuity for the interpolated magnetic field sensor position. FIG. 8 shows a tetrahedron of this type, which is spanned by the calibration positions. For the sake of simplicity, the corner points of the tetrahedron, which respectively correspond to a position vector for a calibration position in the calibration space coordinate system, are given the references $P_1$, $P_2$, $P_3$ and $P_4$. The position vector for the measuring position in the calibration space coordinate system is given the reference $P_M$. The vector representation in FIG. 8 shows that two vectors $\overrightarrow{P_1P_2}$ and/or $\overrightarrow{P_1P_3}$ are defined between the first corner point $P_1$ of the tetrahedron surface $P_1$, $P_2$, $P_3$ and the two corner points $P_2$ and/or $P_3$ of the tetrahedron surface. The cross product $\overrightarrow{P_1P_2} \times \overrightarrow{P_1P_3}$ is computed. To determine on which side of the tetrahedron surfaces spanned by the corner points $P_1$, $P_2$, $P_3$ and/or $P_1$, $P_2$, $P_4$ and/or $P_1$, $P_3$, $P_4$ and/or $P_2$, $P_3$, $P_4$, the measuring position is located. This cross product results in a product vector, positioned perpendicular on the two vectors, meaning the normal for the tetrahedron surface to be viewed $P_1$, $P_2$, $P_3$. Between the first corner point of the tetrahedron surface $P_1$ and the fourth tetrahedron point $P_4$ that is not included in the tetrahedron surface on the one hand and the corner point $P_1$ and the measuring position $P_M$ on the other hand, an additional vector $\overrightarrow{P_1P_4}$ and $\overrightarrow{P_1P_M}$ is defined and the scalar products of the cross product vector are computed with each of the additional vectors $\overrightarrow{P_1P_4}$ and/or $\overrightarrow{P_1P_M}$. If the scalar products have the same algebraic signs, the measuring position $P_M$ is identified as being on the correct side of the tetrahedron surface that is viewed. The cross product and the scalar products are computed for each of the four tetrahedron surfaces. If the measuring position for all tetrahedron surfaces is identified as being on the correct side, the tetrahedron formed by the four tetrahedron surfaces is the one searched for, which encloses the measuring position.

The search for the four suitable calibration positions that enclose the measuring position and thus should be used for the linear interpolating transformation of the measuring position, is carried out as follows and as illustrated in the flow chart in FIG. 1.

Calibration and initialization are performed, per blocks 10, 12. With the arrival of the first measuring position from the magnetic field sensor, block 14, a search on a global level is started in the calibration table, henceforth called a global search, block 16.

Figure 4:
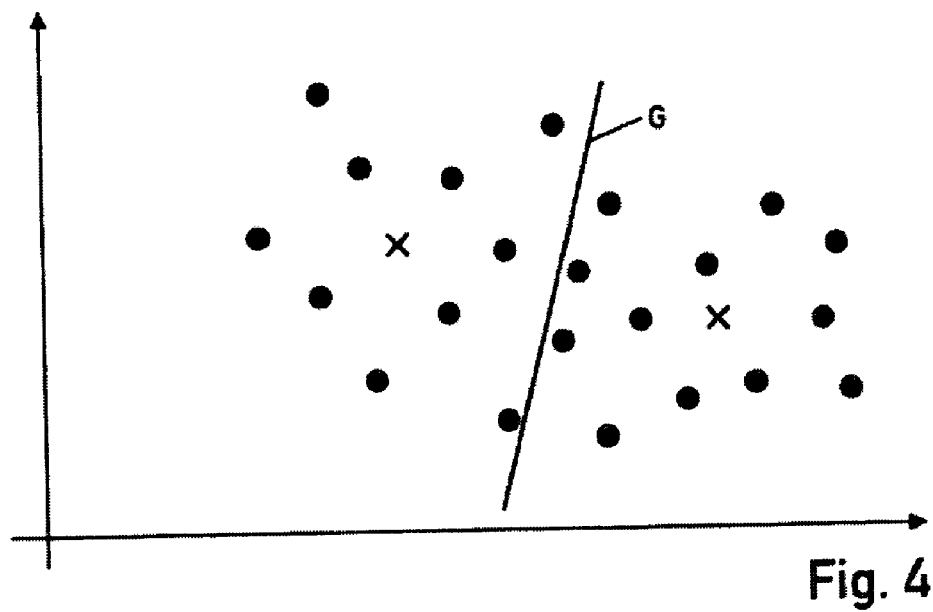
FIG. 4 Sectional views of a two-dimensional representation of the calibration positions in the three-dimensional calibration space coordinate system of the calibration table to explain the cumulative position.

In the calibration process, block 10, the distance to the measuring position is determined for all stored calibration positions in the table and the calibration position with the shortest distance, henceforth called global calibration position, is then output. To shorten the computing time for this process, calibration positions are pre-selected for the shortest distance to the measuring position during an initialization step, block 12, that occurs prior to the global search, block 16. For this, the table is divided into several table sections and a cumulative position is defined in each table section. The determination of the cumulative positions requires approximately the same number of calibration positions. FIG. 4 shows a two-dimensional sectional view of the calibration positions stored in the table in the form of black points to illustrate the initialization action. Two table regions are defined in this segment, which are separated by the dividing line G. A cumulative position (marked by crosses) is determined for each region. A global search is then conducted in such a way that once the first measuring value from the magnetic field sensor arrives, only the distance from the measuring position to the cumulative positions is determined and not the distance from the measuring position to the calibration positions. The cumulative position with the shortest distance to the measuring position is then output as the global calibration position.

Figure 5:
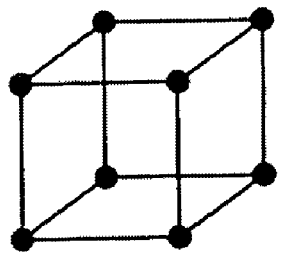
FIG. 5 An example of one of eight grid-point positions in the three-dimensional coordinate system of the cube spanning the real magnetic field space.
Figure 6:
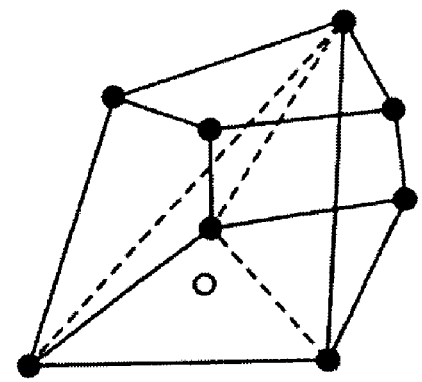
FIG. 6 One of the eight calibration positions, allocated to the eight grid-point positions according to FIG. 5, in the three-dimensional space element that spans the calibration space coordinate system.
Figure 7:
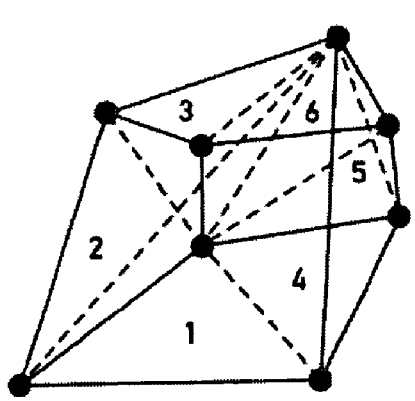
FIG. 7 The space element according to FIG. 6, with six tetrahedrons contained therein.

With the next measuring value, a so-called environmental search is conducted starting with the global calibration position, blocks 18, 20. During the environmental search, a plurality of calibration positions are defined, for which in the real magnetic field space the associated grid-point positions span a plurality of adjoining cubes arranged around a central grid-point position. FIG. 2, for example, shows eight adjoining cubes grouped around a central grid-point position (grid point 8). The central grid-point position (grid point 8) is determined to be the grid-point position associated with the global calibration position that is determined with the global search. A comparison of FIGS. 5 and 6 shows that eight calibration positions are allocated in the calibration table to the eight grid-point positions of each cube. Together, these form an octagonal, non-symmetrical space element in the calibration space coordinate system. FIG. 7 shows that this space element can be divided into six tetrahedrons. For the exemplary embodiment with eight defined cubes, eight space elements with respectively six tetrahedrons are obtained. Following this, a tetrahedron test is performed for each tetrahedron during the environmental search, as previously described, block 22. If no tetrahedron meeting the test criteria is found during the environmental search, the process returns to block 14 and the global search is re-started with the next measuring value and a new environmental search is then carried out. If a tetrahedron that encloses a measuring position is found during the environmental search, the testing for further tetrahedrons is stopped and the linear interpolating transformation is realized as described in the above with the calibration positions that define the found tetrahedron, blocks 24, 26. Once the true position of the magnetic field sensor is determined in this way, the true orientation is determined and the following measuring value from the magnetic field sensor awaited.

If a new measuring value arrives, a local search is started in the calibration table to find the four calibration positions suitable for spanning the tetrahedron which encloses the measuring position in the calibration space coordinate system, blocks 28, 30. Eight calibration positions are used for this, the associated grid positions of which describe a cube in the real space coordinate system, as shown in FIG. 5. The eight calibration positions belonging to this cube define an octagonal space element in the calibration space coordinate system, as shown in FIG. 6. This space element in turn contains six tetrahedrons, such as the ones numbered 1 to 6 in FIG. 7. During the local search, a tetrahedron test is carried out for each of the six tetrahedrons, as described in the above. A cube and/or an associated space element is selected during the local search, in which a tetrahedron enclosing the measuring position was found during the preceding measuring cycle. In general, the cube selection is determined through prediction based on preceding measuring cycles, wherein the true position found in the preceding measuring cycle offers itself as the simplest prediction. If a tetrahedron enclosing the measuring position is found during the local search, block 32, the linear interpolating transformation of the measuring position is carried out with the four calibration positions that determine the tetrahedron, which results in the true position of the magnetic field sensor that is used to determine the true orientation of the measuring field sensor. Following this, the next measuring value delivered by the magnetic field sensor is awaited. Since a tetrahedron enclosing the new, current measuring value is generally found, the method largely winds down within the method phase shown with dash-dot line in FIG. 1.

If no suitable tetrahedron is found during the local search and after checking all six tetrahedrons, an environmental search is conducted, block 34, as described in the above. A predicted grid-point position is selected as central grid-point position and is spanned by the adjoining cubes, wherein the prediction occurs based on preceding measuring cycles. In the simplest case, the grid-point position that is closest to the true position determined during the preceding measuring cycle is predicted as central grid-point position. If a suitable tetrahedron is found in the process, block 36, the orientation determination and position determination are stared once more and the following measuring value is awaited, blocks 24–28. If no suitable tetrahedron is found during the environmental search, the values determined during the preceding measuring cycle for the true position and true orientation of the magnetic sensors are "frozen," block 38, meaning they are retained and not changed based on the current measuring value. The following measuring value is then awaited, block 40. Since the freezing interrupts the position tracking, a global search as described in the above is carried out with the following, new measuring value from the magnetic field sensor and the global calibration position is determined in the process, blocks 42, 44. An environmental search is conducted with the measuring value and the pre-determined global calibration position, in the same way as previously described, block 46. If the correct tetrahedron is found during the environmental search, then its calibration position is used to determine the true position and following this the true orientation of the magnetic field sensor, block 48. If no suitable tetrahedron is found during this environmental search either, the values determined during the preceding measuring cycle for the true position and true orientation of the magnetic field sensor are "frozen" and the following measuring value awaited, blocks 50, 52. A new environmental search is conducted with the following new measuring value and, if a suitable tetrahedron is found, a new position and orientation determination is triggered, blocks 54, 56. If no suitable tetrahedron is found, the true values for position and orientation, determined during the preceding measuring cycle, are frozen again, block 38, whereupon the process returns to block 40 and a global search is started with the next new measuring value.

I claim:

1. A method for determining and tracking the changing, true position and orientation of a magnetic field sensor within a three-dimensional magnetic field space from measuring position and measuring orientation values measured by the magnetic field sensor, comprising:
   structuring the magnetic field space into a three-dimensional grid with equidistant grid points;
   successively measuring values with the magnetic field sensor with constant orientation while the magnetic filed sensor is positioned at each of the different grid points;
   storing the values in a calibration table as calibration positions and calibration orientations associated with real positions of the grid points in a real space coordinate system;
   determining four calibration positions from the calibration table that span a tetrahedron enclosing the measuring position in a calibration space coordinate system; and
   for continuously measured, actual measuring values from the magnetic field sensor, performing a linear interpolating transformation of the measuring position to the real space coordinate system based on the four calibration positions; and outputting the transformed measuring position as a true position of the magnetic field sensor.

2. The method according to claim 1, further comprising determining a transformation matrix (A) based on the four calibration positions, such that the four calibration positions are transformed to the real space coordinate system and that the measuring position is transformed with the aid of the transformation matrix (A).

3. The method according to claim 2, further comprising:
   displacing a first position of the four calibration positions to a point of origin of the calibration space coordinate system prior to the transformation;
   displacing the other three calibration positions by the position coordinates of the first calibration position;
   displacing a first grid-point position associated with the first calibration position to a point of origin of the real space coordinate system;
   displacing the other three grid-point positions by position coordinates of the first grid-point position, wherein a transformation with the displaced calibration positions ($\vec{p}_i^{M,V}$) and the displaced grid-point positions ($\vec{p}_i^{V}$) is realized as:

$$\vec{p}_i^{V} = A\vec{p}_i^{M,V} \text{ with } i=1, 2, 3 \qquad (1)$$

4. The method according to claim 3, further comprising: applying the transformation matrix (A) to the measuring position ($\vec{p}^{M,V}$), displaced by the position coordinates of the first calibration position, as follows:

$$\vec{p}^{V} = A\vec{p}^{M,V} \qquad (2)$$

and
following this transformation, reversing the displacement in the real space coordinate system.

5. The method according to claim 1, further comprising:
   determining on which side of surfaces of the tetrahedron the measuring position is located; and
   identifying the measuring position as enclosed if the measuring position on all surfaces of the tetrahedron is located on the same side of the tetrahedron surface.

6. The method according to claim 5, further comprising:
   defining two vectors between a first corner point ($P_1$) of the tetrahedron surface and the two other corner points ($P_2$, $P_3$);
   computing a cross product of the two vectors;
   defining one additional vector between the first corner point ($P_1$) of the tetrahedron surface and the fourth tetrahedron point ($P_4$) that is not included in the tetrahedron surface and the measuring position ($P_M$);
   computing scalar products of the cross product vector resulting from the cross product for each of the additional vectors; and
   recognizing the measuring position as being located on the correct side of the tetrahedron surface if the scalar products have the same algebraic signs.

7. The method according to claim 5, wherein determining the four calibration positions comprises:
   determining a space element spanned by eight calibration positions that are associated with eight grid-point positions describing a cube in the real space coordinate system; and
   performing a tetrahedron test each of six tetrahedrons in the space element.

8. The method according to claim 7, wherein the cube encloses a true position that is predicted with the aid of at least one preceding measuring cycle.

9. The method according to claim 7, further comprising stopping the tetrahedron test when a tetrahedron enclosing the measuring position is located.

10. The method according to claim 5, wherein determining the four calibration positions comprises:
    determining a space element spanned by calibration positions for which the associated grid-point positions in the real space coordinate system describe a plurality of adjoining cubes that are grouped around a central grid-point position; and
    performing a tetrahedron test for each of the tetrahedrons in the space element.

11. The method according to claim 10, further comprising selecting the grid-point position closest to a true position predicted with the aid of at least one preceding measuring cycle as the central grip-point position.

12. The method according to claim 10, further comprising selecting the grid-point position for which the associated calibration position is closest to a global calibration position determined during a global search performed in the calibration space coordinate system as the central grid-point position.

13. The method according to claim 12, further comprising:
determining a distance to the measuring position during the global search for all calibration positions stored in the calibration table; and
outputting the calibration position with the shortest distance as the global calibration position.

14. The method according to claim 12, further comprising:
dividing the calibration table is into several table regions;
defining a cumulative position for each table region;
determining the distance between the measuring position and the cumulative position during the global search; and
outputting the cumulative position with the shortest distance as the global calibration position.

15. The method according to claim 14, wherein the table regions are determined such that each cumulative position is determined with the aid of approximately the same number of calibration positions.

16. The method according to claim 1, further comprising:
determining a correction orientation with the aid of the true position of the magnetic field sensor; and
applying the correction orientation to the measuring orientation for determining the true orientation of the magnetic field sensor.

17. The method according to claim 16, further comprising performing a trilinear interpolation to determine the correction orientation with the aid of the calibration orientations, for which the associated grid-point positions span a cube enclosing the true position in the real space coordinate system.

18. A method of determining a position of a magnetic filed sensor, comprising:
determining four calibration points from a calibration table that span a tetrahedron in a calibration space coordinate system that encloses a measuring position measured by the magnetic field sensor;
performing a linear interpolating transformation of the measuring position to a real magnetic field space based on the four calibration points; and
outputting the transformed measuring position a true magnetic sensor position.

19. The method of claim 18, further comprising:
displacing a first of the four calibration points to an origin of the calibration space coordinate system; and
displacing the other of the four calibration points by position coordinates of the first of the four calibration points.

20. The method of claim 19, further comprising:
displacing a first grid point associated with the first of the four calibration points to an origin of a real space coordinate system; and
displacing grid points associated with the other of the four calibration points by position coordinates of the first grid point.

21. The method of claim 18, further comprising:
selecting eight calibration points from the calibration table that are associated with grid points in the real space coordinate system that span a cube enclosing the true magnetic sensor position; and
performing a trilinear interpolation with the eight calibration points to determine a correct orientation of the magnetic sensor.

* * * * *